US012752458B2

(12) United States Patent
Krentz et al.

(10) Patent No.: US 12,752,458 B2
(45) Date of Patent: Oct. 6, 2026

(54) HYBRID MOLD VIBRATION

(71) Applicant: BESSER COMPANY, Alpena, MI (US)

(72) Inventors: Douglas Krentz, Alpena, MI (US); Daniel Campau, Fennville, MI (US); Alex Guzman, Alpena, MI (US); Clay Cross, Alpena, MI (US)

(73) Assignee: Besser Company, Alphena, MI (US)

( * ) Notice: Subject to any disclaimer, the term of this patent is extended or adjusted under 35 U.S.C. 154(b) by 22 days.

(21) Appl. No.: 19/091,675

(22) Filed: Mar. 26, 2025

(65) Prior Publication Data

US 2025/0222621 A1 Jul. 10, 2025

Related U.S. Application Data

(62) Division of application No. 17/966,763, filed on Oct. 14, 2022, now Pat. No. 12,325,150.

(60) Provisional application No. 63/255,560, filed on Oct. 14, 2021.

(51) Int. Cl.
*B28B 1/087* (2006.01)

(52) U.S. Cl.
CPC .... *B28B 1/0873* (2013.01); *B28B 2001/0876* (2013.01)

(58) Field of Classification Search
CPC .......... B28B 1/0873; B28B 1/16; B28B 1/087
See application file for complete search history.

(56) References Cited

U.S. PATENT DOCUMENTS 4,830,597 A * 5/1989 Steier .................... B28B 1/0873
425/456
12,325,150 B2 * 6/2025 Krentz .................. B28B 1/0873

* cited by examiner

*Primary Examiner* — Virak Nguon
(74) *Attorney, Agent, or Firm* — Mechanicus PLLC

(57) ABSTRACT

A hybrid vibration assembly for a concrete products machine. The assembly may include a vibration frame positioned to carry at least a portion of a mold, a stationary frame carrying the vibration frame, knocker bars supportable on the stationary frame for vertical adjustment relative to the stationary frame, and a motor connected to a vibrator mounted on the vibration frame. The assembly may also include a mechanical frame/mold clamp that alternately couples the vibration frame to the mold and decouples the vibration frame from the mold.

6 Claims, 8 Drawing Sheets

HYBRID MOLD VIBRATION

CROSS-REFERENCES TO RELATED APPLICATIONS

This application is a division of U.S. patent application Ser. No. 17/966,763 filed Oct. 14, 22, and claims the benefit of the filing date of U.S. Provisional Patent Application Ser. No. 63/255,560 filed Oct. 14, 2021, which is incorporated herein by reference in its entirety.

STATEMENT REGARDING FEDERALLY SPONSORED RESEARCH OR DEVELOPMENT

Not Applicable

BACKGROUND

Field

This application relates generally to concrete product manufacturing devices.

Description of Related Art Including Information Disclosed Under 37 CFR 1.97 and 1.98

Concrete products machines generally include some form of vibration assembly to remove air pockets during the forming of a concrete product. Known vibration assemblies may employ vibration means such as rotary vibrations to shake the mold, or impact tables that strike the bottom of the production pallet to induce vibration. However, due to the variety of concrete products being molded, a given product may benefit from one vibration type, while being harmed by another. Current vibration technology for concrete products machines uses one or the other type of vibration, which is not optimal for every product.

SUMMARY

A hybrid vibration assembly comprising a concrete product mold, a vibration frame positioned to transmit vibration to at least a portion of the mold, and a stationary frame carrying the vibration frame. The assembly also comprises knocker bars supportable on the stationary frame in positions where, when installed, they carry at least a portion of the mold, a motor operatively connected to a vibrator mounted on the vibration frame, and a mechanical frame/mold clamp positioned and actuable to alternately couple the vibration frame to the mold and decouple the vibration frame from the mold.

DRAWING DESCRIPTIONS

These and other features and advantages will become apparent to those skilled in the art in connection with the following detailed description and appended drawings of one or more embodiments of the invention, in which.

Figure 1:
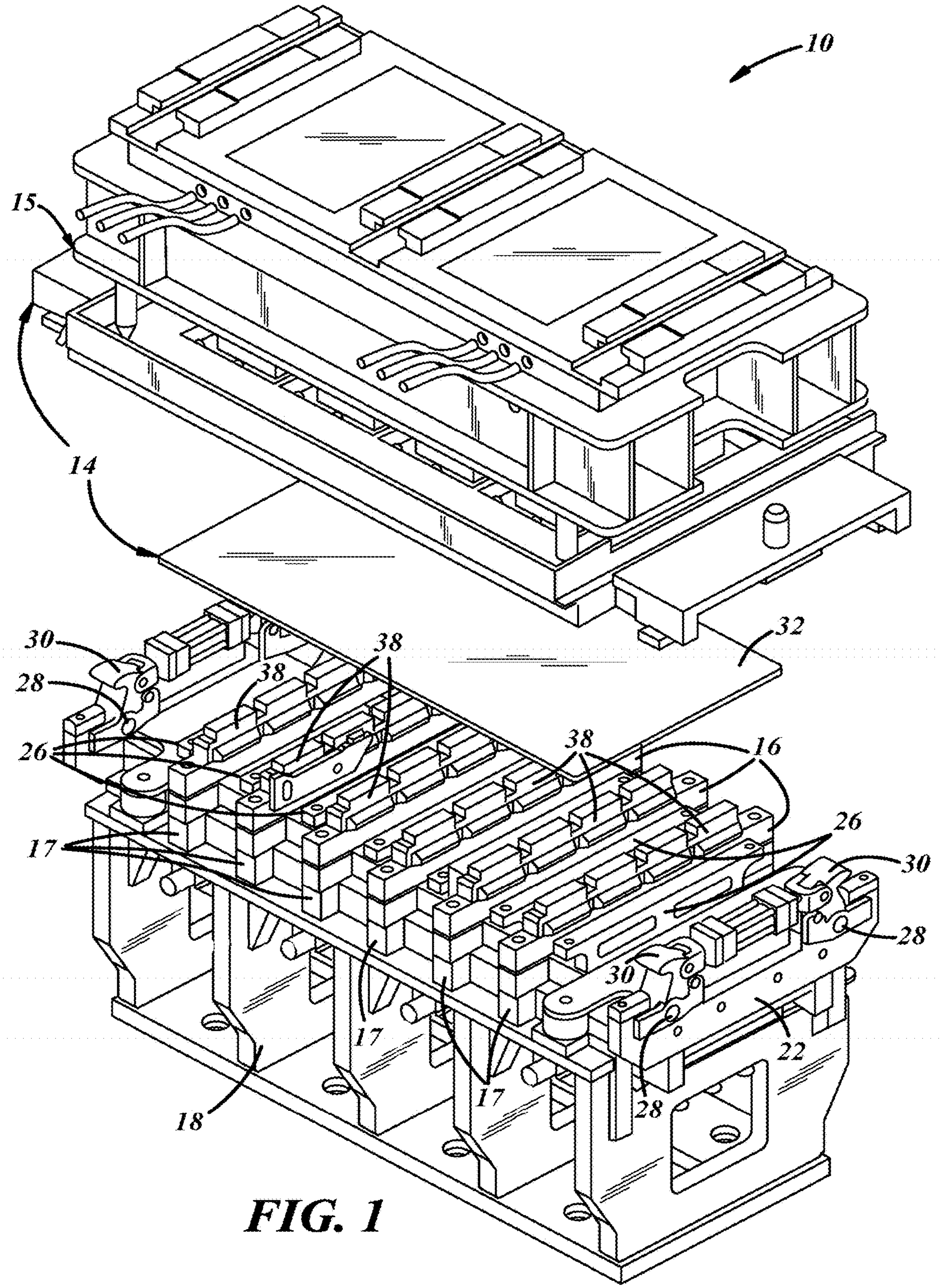
FIG. 1 is a partially-exploded perspective view of a hybrid vibration assembly showing separation between a mold box, a pallet, and a stationary frame of the assembly, the stationary frame being shown supporting a vibration frame of the assembly, the stationary frame also being shown supporting knocker bars and pallet rubbers.
Figure 5:
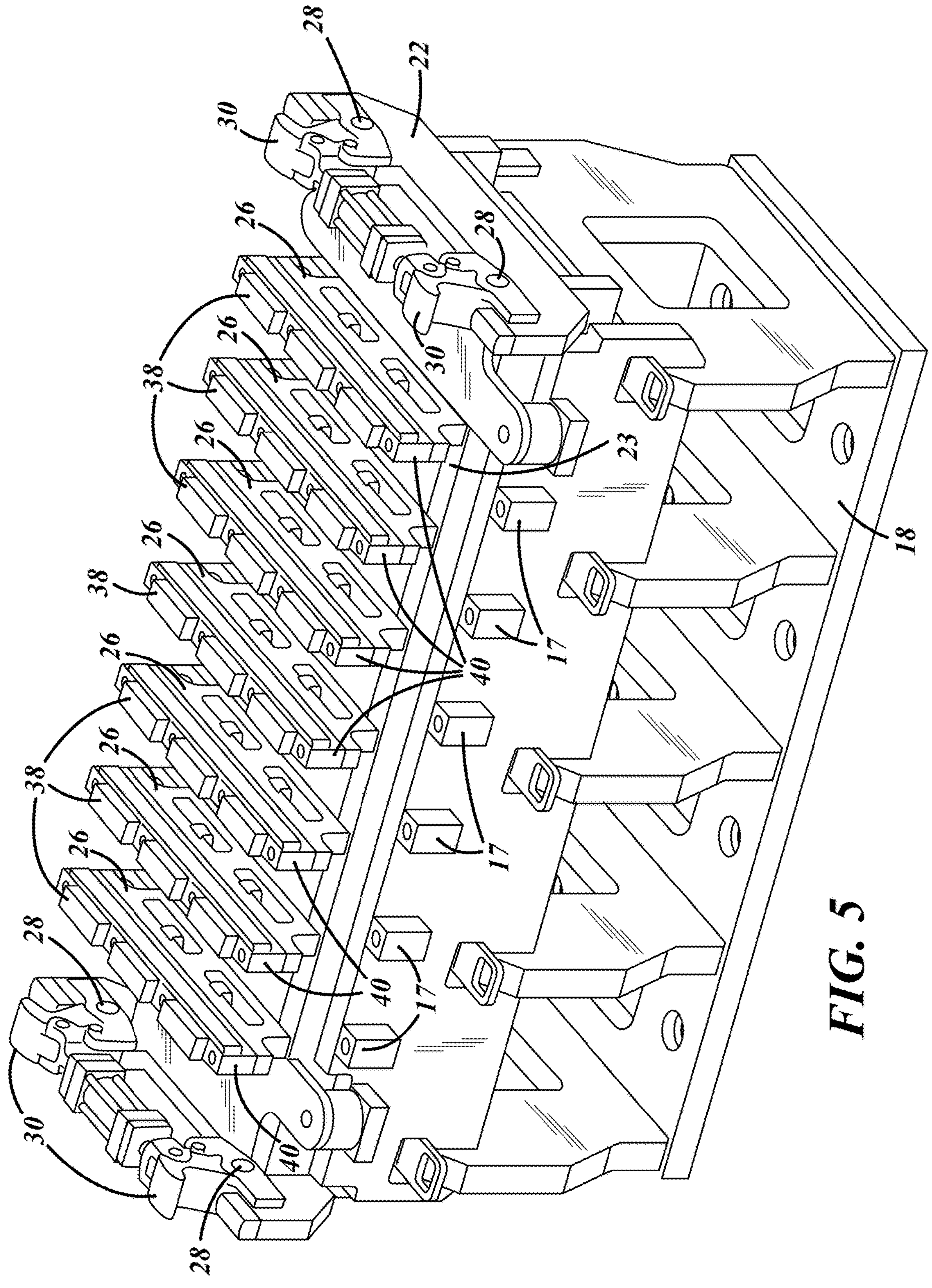
FIG. 5 is a perspective view of the stationary frame and vibration frame of FIG. 4, showing the assembly configured for operation in a traditional vibration mode including pallet rubbers and standoff extensions fastened atop standoffs of the vibration frame.
Figure 6:
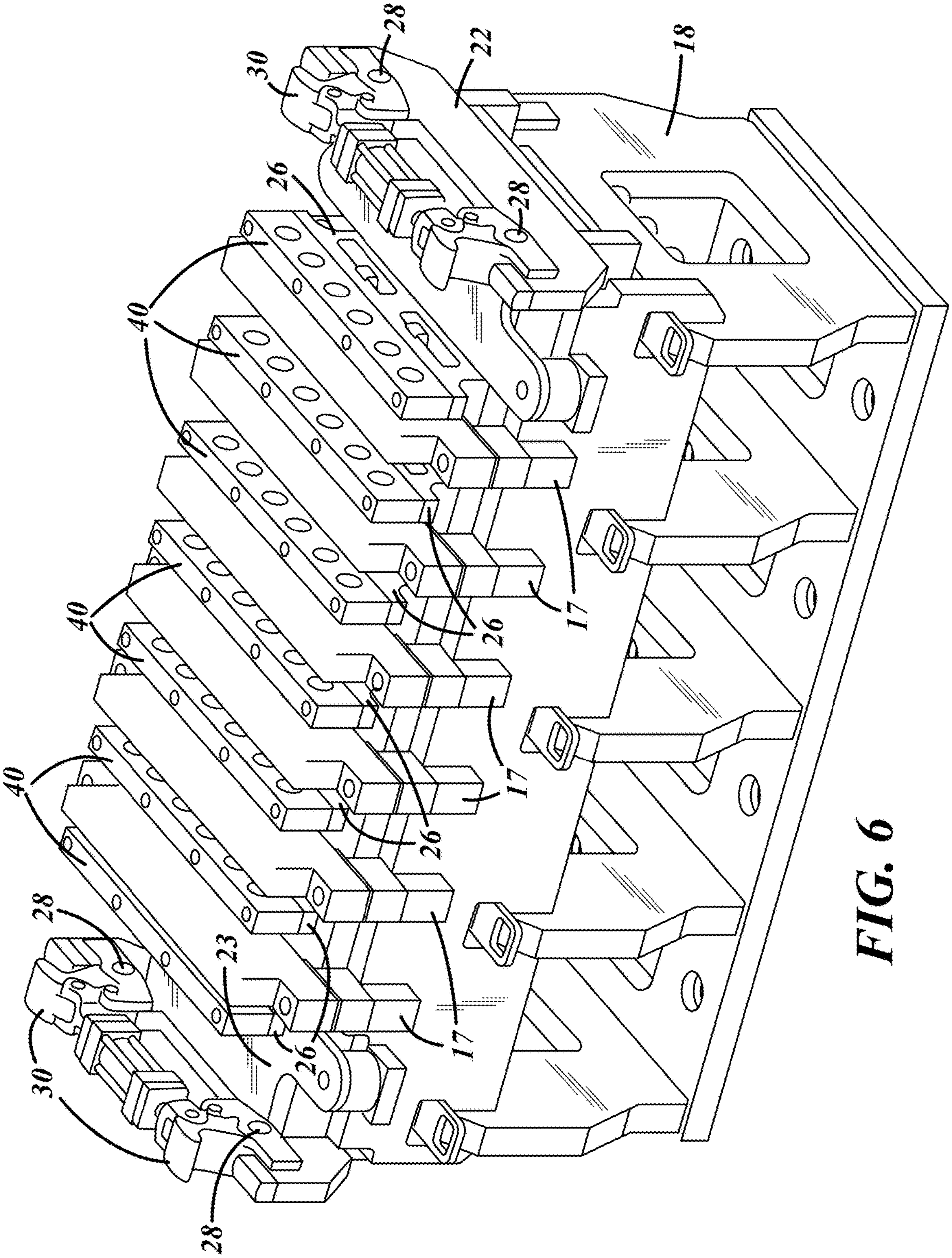
FIG. 6 is a perspective view of the stationary frame and vibration frame of FIG. 4, showing the assembly configured for an impact vibration mode including knocker bars and standoff extensions installed on the vibration frame.
Figure 9:
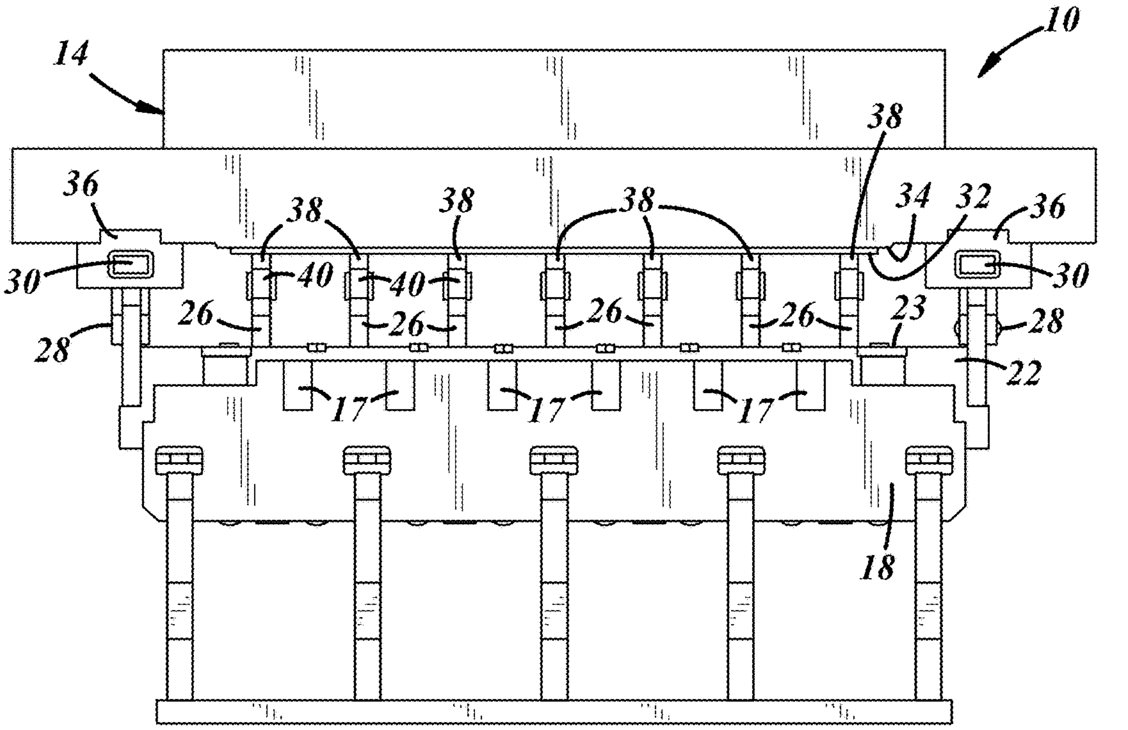
Figure 10:
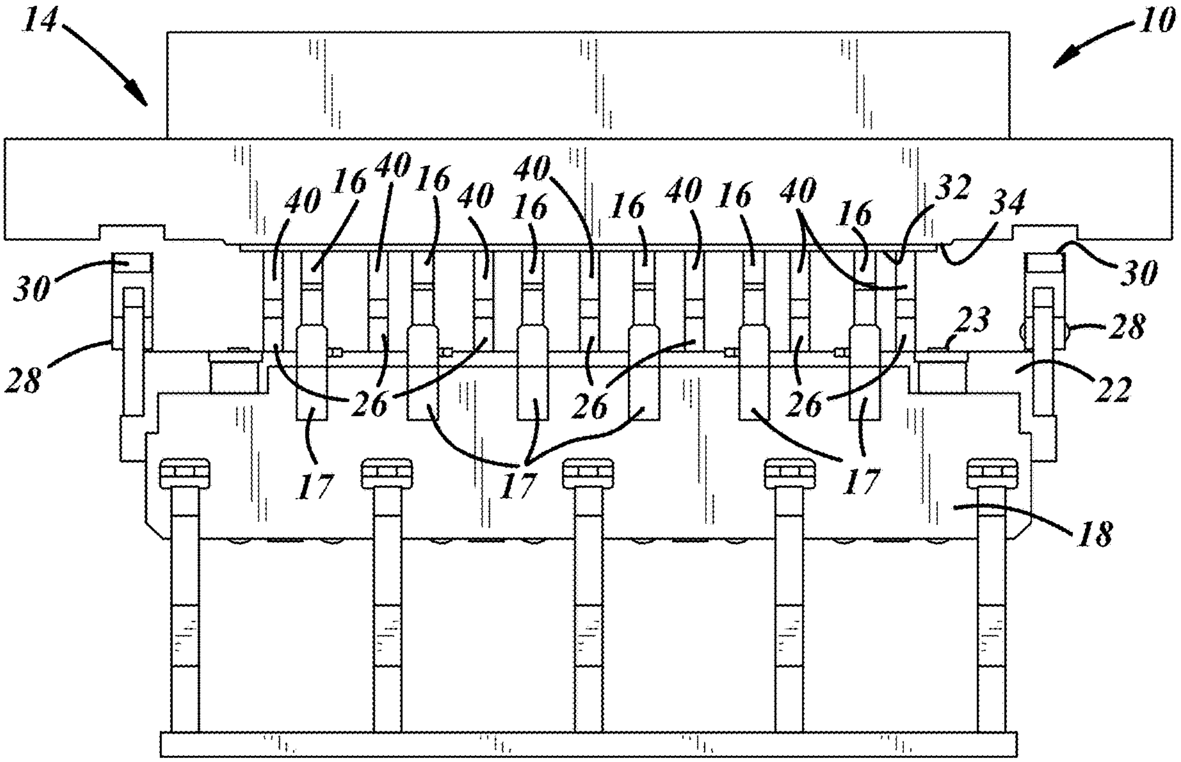

FIG. 9 is a front view of the assembly of FIG. 1 configured for a clamped vibration mode, showing the vibration frame configured as shown in FIG. 5 but with the mold clamped to the vibration frame; and FIG. 10 is a front view of the assembly of FIG. 1, showing the vibration frame configured for impact mode as shown in FIG. 6, with the addition of the mold seated above the vibration and stationary frames.

DETAILED DESCRIPTION

Figure 2:
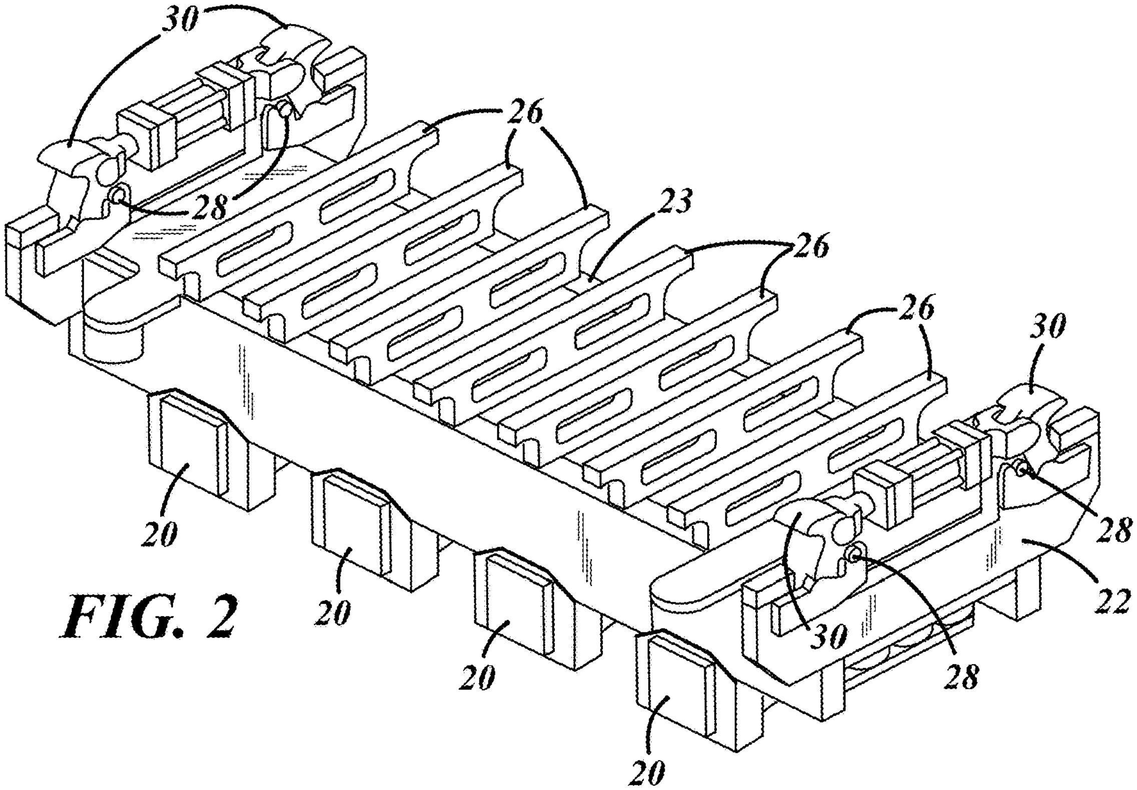
FIG. 2 is a perspective view of the assembly's vibration frame of FIG. 1.
Figure 3:
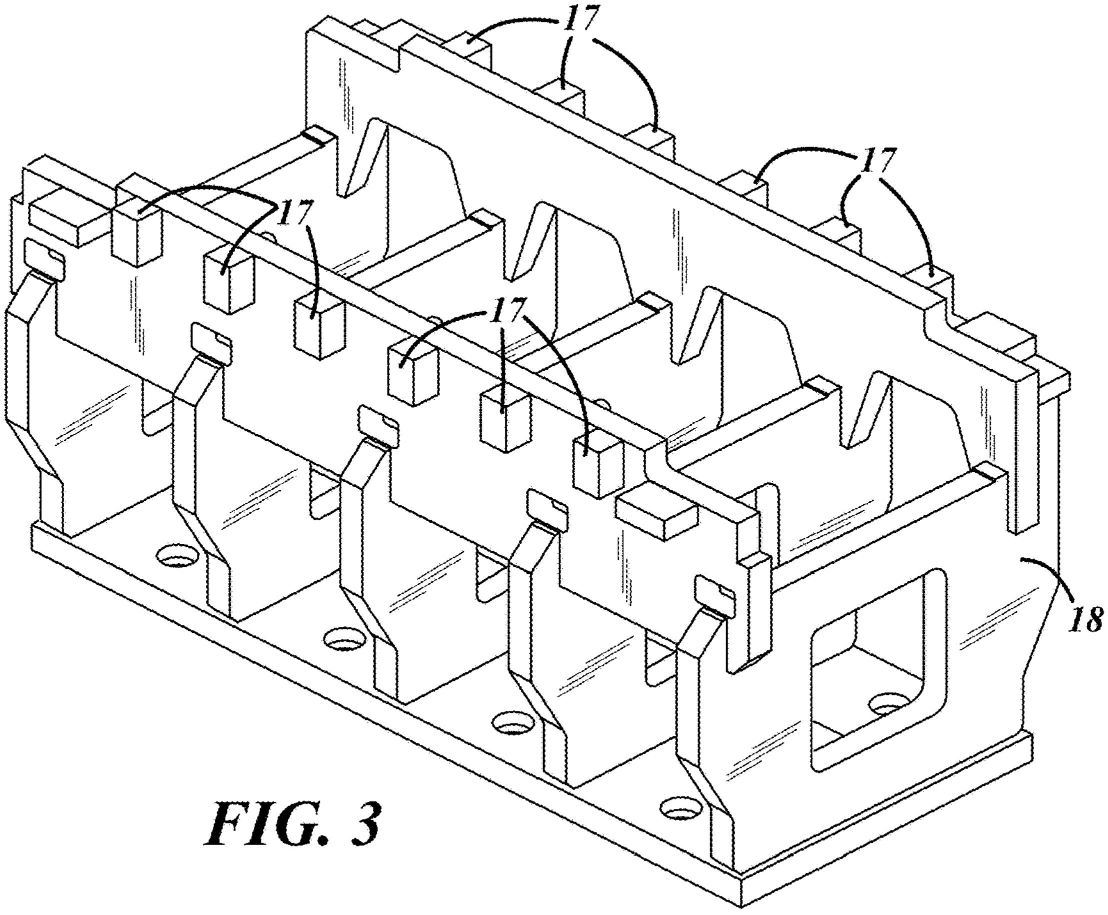
FIG. 3 is a perspective view of the assembly's stationary frame of FIG. 1.
Figure 4:
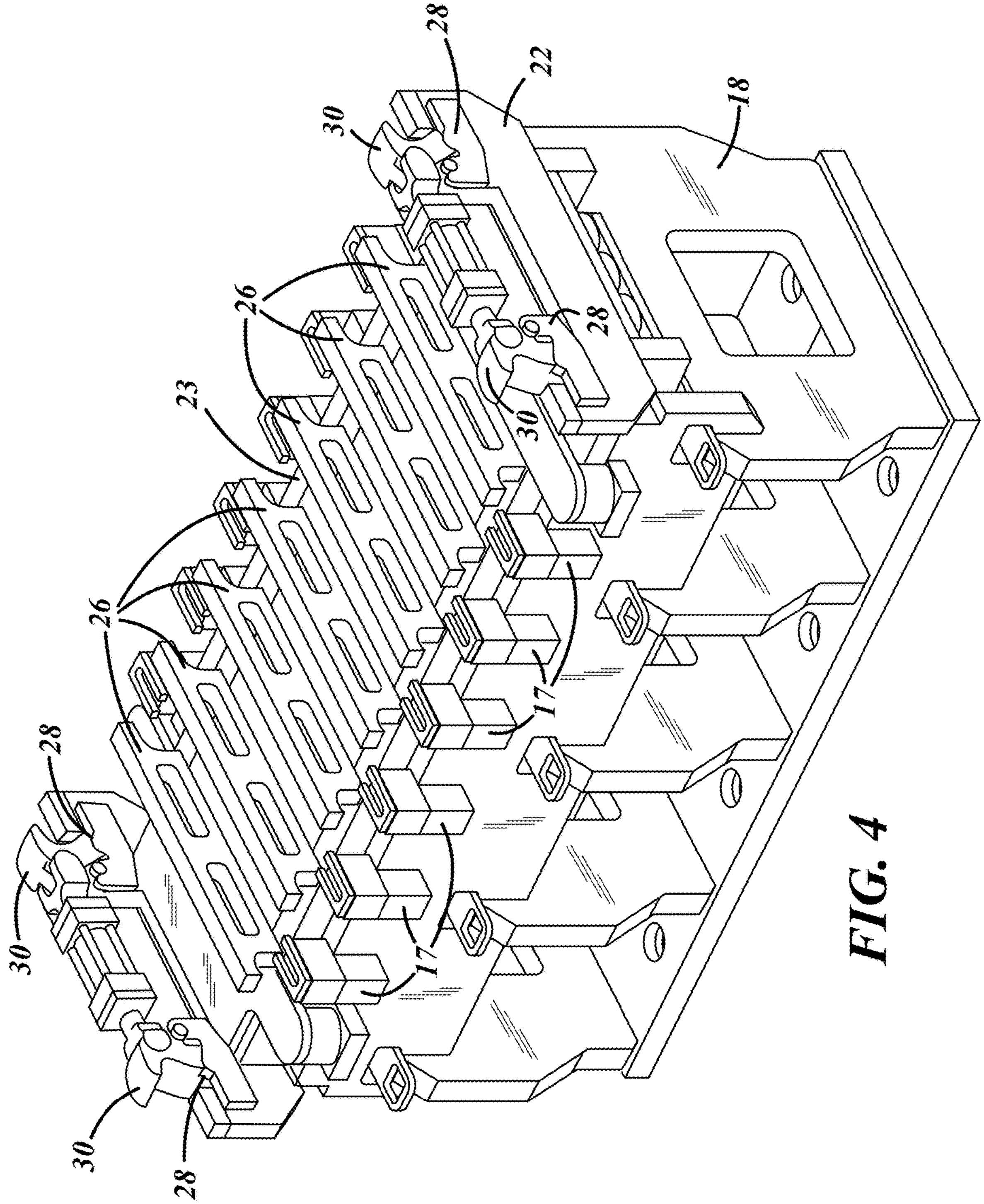
FIG. 4 is a rotated perspective view of the stationary frame and vibration frame of FIG. 1, shown without the knocker bars or pallet rubbers of FIG. 1.
Figure 7:
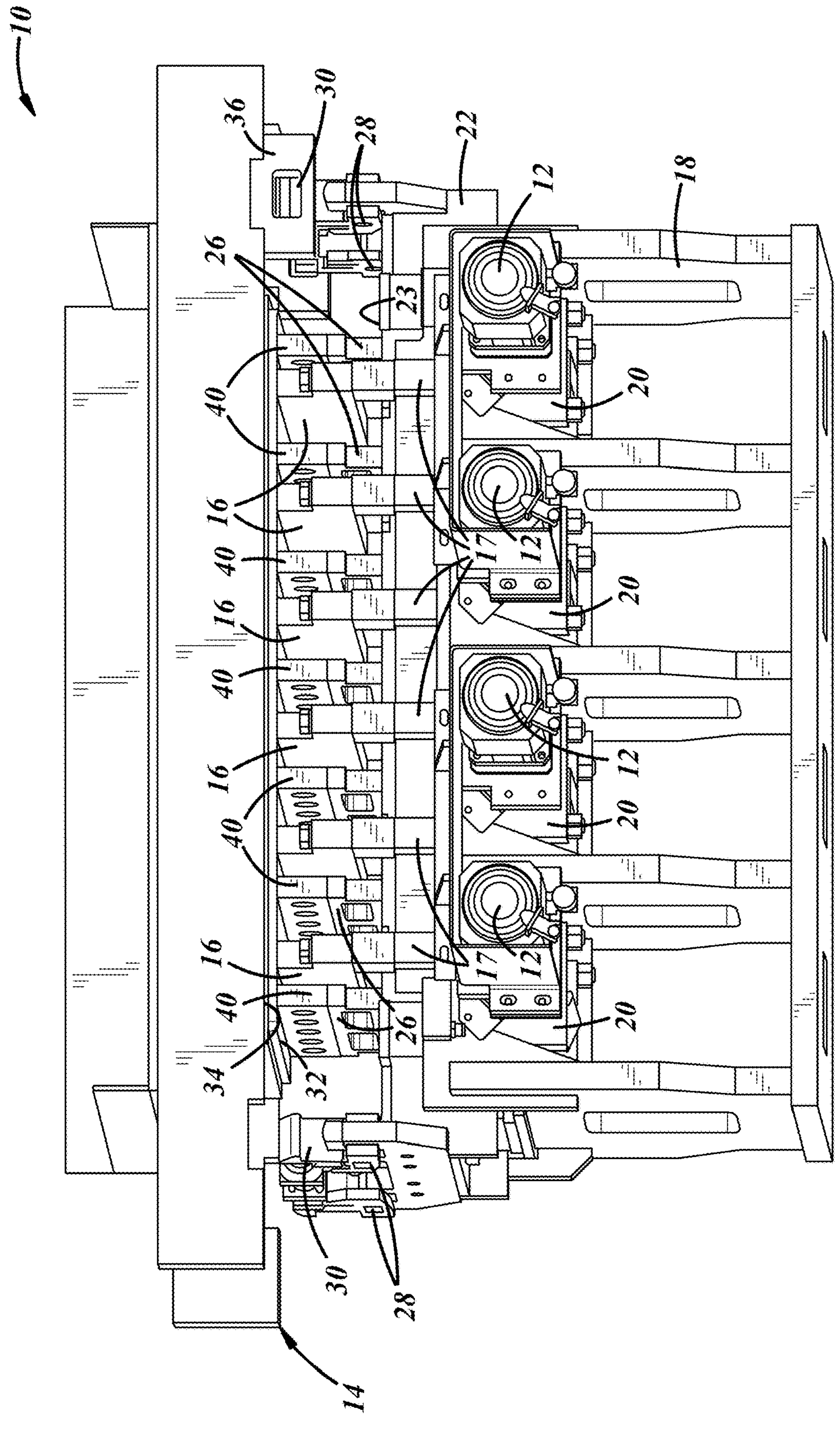
FIG. 7 is a lower perspective view of the assembly of FIG. 1 configured in impact mode, and showing motors attached to the vibration frame.

A hybrid vibration assembly for a concrete products machine is generally shown at 10 in the figures. As shown in FIG. 7, the assembly 10 comprises one or more motors 12 operatively connected to other components of the vibration assembly 10, so that the motors 12, when actuated, drive vibrators 20 (which may comprise eccentric-weight rotary vibrators) mounted to a vibration frame 22 configured to carry a mold 14 of a concrete products machine, and thereby transmit vibration to the contents of the mold 14. The motors 12 and the vibration frame 22 may be supported by a stationary frame 18 of the assembly 10 (as best shown by comparing FIGS. 2-4).

The motors 12 may be adjusted to change frequency and/or amplitude of the vibrators 20 by changing the speed and/or phase of the eccentric weight vibrators 20. The adjustment of the motors 12 may be either manually-adjusted, or via an automated controller programmed to respond to a remote operator input. While the motors are shown supported by stationary frame 18 in the preferred embodiment shown in FIG. 7, in alternate embodiments the motors may be mounted anywhere on or adjacent the assembly 10, and may drive the vibrators directly, or via remote linkages such as flexible driveshafts known in the art.

As shown in FIGS. 1, 6, 7, 8, and 10, the stationary frame 18 may also support removable knocker bars 16. The knocker bars 16 may be removably supported on knocker bar mounting points 17 on the stationary frame 18. The knocker bar mounting points 17 may permit vertical adjustment of the knocker bars 16 relative to the stationary frame 18.

The vibration frame 22 may be configured to carry, and transmit vibration to, the mold 14 in several different ways depending on the type of vibration desired for the mold 14. For example, the vibration frame 22 may include standoffs 26 mounted to an upper vibration frame surface 23 and configured to support the weight of the mold 14, as well as frame connection points 28 for one or more mechanical frame/mold clamps 30 configured to alternately couple the vibration frame 22 to the mold 14 and decouple the vibration frame 22 from the mold 14. The vibration frame standoffs 26 may be positioned to be horizontally interleaved with the knocker bars 16 when the knocker bars 16 are supported on the stationary frame 18.

The mold 14 may comprise a typical concrete product pallet mold, i.e., comprising a mold box 15, and a pallet 32 configured to removably cover an open bottom 34 of the mold box 15, so that concrete products may be left on the pallet 32 after demolding. The standoffs 26 of the vibration frame 22 and/or the knocker bars 16 may be positioned to support the pallet 32. The frame/mold clamps 30 may also attach to the mold 14 at mold connection points 36 on the mold box 15. These mold connection points may alternatively be located anywhere on the mold 14, but in a preferred embodiment, none of these mold connection points 36 are located on the pallet 32.

The assembly may include pallet rubbers 38 made from a resilient material. The pallet rubbers 38 may be positioned between the pallet 32 and other components of the assembly 10 where a buffer is desired. In the preferred embodiment shown in the Figures, the pallet rubbers 38 are shown in several possible positions fastened atop the knocker bars 16 (in FIGS. 1 and 8) and/or atop standoff extensions 40 (in FIGS. 5 and 9).

The standoff extensions 40 comprise bars of a hard material that are removably supportable atop the standoffs 26. The extensions 40 are shaped to contact the mold when it is at least partially-supported by the knocker bars, effectively allowing transmission of vibration from the vibration frame 22 through the standoffs 26, and into the pallet 32.

The hybrid vibration assembly 10 may be configured to agitate the mold 14 in several different modes. These different modes may comprise variations in how the pallet 32 and mold 14 are supported and/or attached to the vibration frame 22, and variations in how the contents of the mold 14 are agitated.

Figure 8:
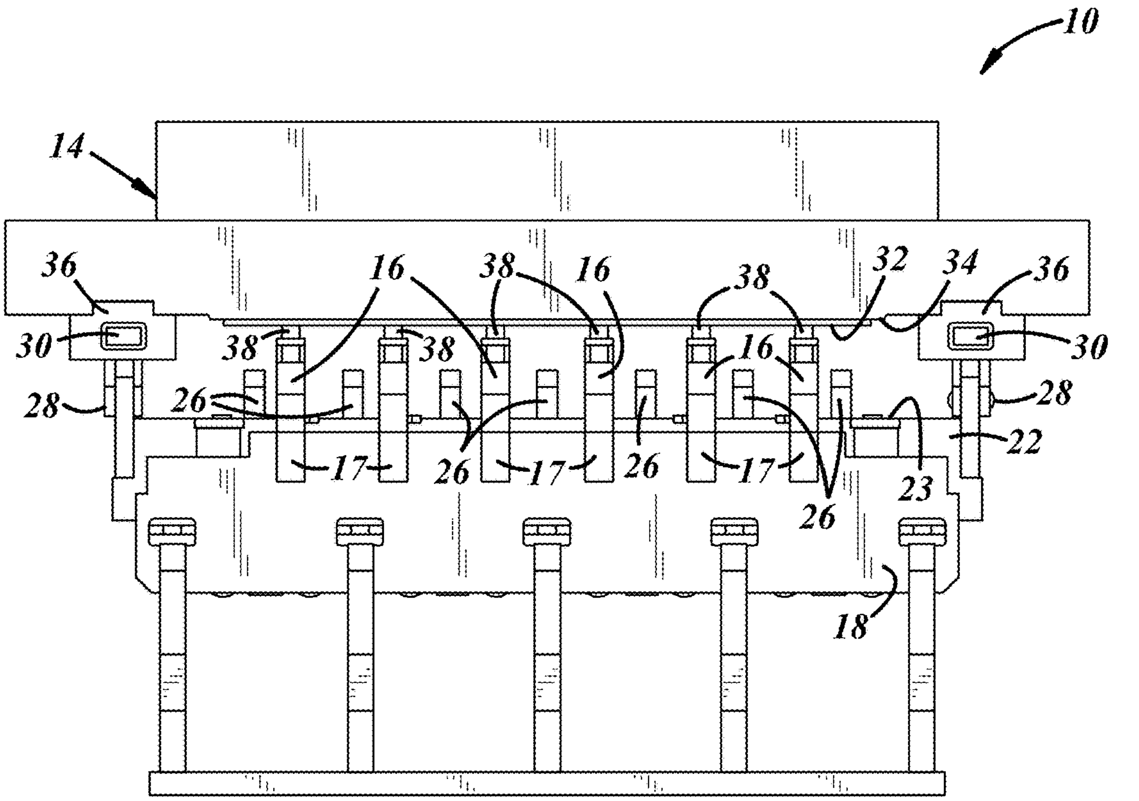
FIG. 8 is a front view of the assembly of FIG. 1 configured for the traditional vibration mode, showing knocker bars and pallet rubbers attached to the stationary frame.

In a first "traditional" vibration mode, shown in FIGS. 1 and 8, the assembly 10 may be configured to support the pallet 32 via the knocker bars 16 and to support the mold box 15 via the vibration frame 22, allowing limited motion between the pallet 32 and mold box 15 for a troweling effect on a concrete product being molded. According to this configuration, the frame/mold clamps 30 are coupled, the knocker bars 16 are moved into engagement with the pallet 32; the knocker bars 16 are then mechanically locked stationary; and the motors 12 actuate the vibrators 20 mounted on the vibration frame 22, sending vibration into the mold box 15 through the clamps 30, while the pallet 32 rides atop the knocker bars 16. In this classic vibration mode, the pallet rubbers 38 may be fastened atop the knocker bars 16 so that the pallet 32 rests on the rubbers 38. In this "traditional" vibration mode, the assembly 10 may approximate the effect of earlier known vibration devices, such as the Besser Servopac®.

In a second "clamped" mode, shown in FIGS. 5 and 9, the assembly 10 is configured to impart vibratory motion to the mold 14 by coupling the frame/mold tie 30, moving the knocker bars 16 out of engagement with the pallet 32 (or by removing the knocker bars 16 from their mounting points 17), fastening standoff extensions 40 atop the vibration frame standoffs 26, fastening pallet rubbers 38 atop the vibration frame standoffs 26, and actuating the motors 12 to drive the vibrators 20 mounted to the vibrating frame 22. In this mode, the pallet 32 is clamped against the mold box 15 via the vibration frame pallet rubbers 38 and the frame/mold clamps 30 so that the pallet 32 cannot move relative to the mold box 15.

In a third, "impact," mode, shown in FIGS. 6, 7, and 10, the assembly 10 is configured to impart vibratory motion to the mold 14 by fastening the standoff extensions 40 (preferably lacking the pallet rubbers 38 of the second mode) to the vibration frame standoffs 26, decoupling the frame/mold clamps 30, installing knocker bars 16 and adjusting them to engage and support the mold 14, and actuating the motors 12 to cause the extensions 40 to vibrate with the vibration frame 22 and repeatedly strike the pallet 32 of the mold 14. In this configuration, the mold 14 is not attached to the vibration frame 22 via the frame/mold clamps 30, but the mobility of the mold 14 may still be limited to some degree by mold clamps or similar interfaces with a conventional concrete products machine known and typical in the art.

The word vibration, as used in this document, is intended to cover any rapid motion about and/or across an equilibrium position relative to one or more axes, and includes but is not limited to oscillatory motion, linear reciprocal motion, rotary reciprocal motion, and random motion.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A hybrid vibration assembly comprising;

a concrete product mold;

a vibration frame positioned to transmit vibration to at least a portion of the mold;

a stationary frame carrying the vibration frame;

knocker bars supportable on the stationary frame in positions where, when installed, they carry at least a portion of the mold;

a motor operatively connected to a vibrator mounted on the vibration frame; and a mechanical frame/mold clamp positioned and actuable to alternately couple the vibration frame to the mold and decouple the vibration frame from the mold.

2. The hybrid vibration assembly of claim 1 in which the mold comprises a mold box and a pallet configured to removably cover an open bottom of the mold box.

3. The hybrid vibration assembly of claim 2 in which the frame/mold clamp couples the vibration frame to the mold by coupling the vibration frame to the mold box.

4. The hybrid vibration assembly of claim 1 in which the vibration frame includes vibration frame standoffs mounted to an upper vibration frame surface and positioned to carry at least a portion of the mold.

5. The hybrid vibration assembly of claim 4 in which the knocker bars and vibration frame standoffs are horizontally interleaved when the knocker bars are supported on the stationary frame.

6. The hybrid vibration assembly of claim 4 in which:

the knocker bars carry at least a portion of the mold;

the standoffs are shorter than the extended knocker bars; and the assembly includes vibration frame standoff extensions that are removably supportable atop the standoffs and shaped to contact the mold when it is at least partially-supported by the knocker bars.

* * * * *